United States Patent
Donzier et al.

(10) Patent No.: US 11,629,588 B2
(45) Date of Patent: Apr. 18, 2023

(54) METHOD AND DEVICE FOR DEPTH POSITIONING DOWNHOLE TOOL AND ASSOCIATED MEASUREMENT LOG OF A HYDROCARBON WELL

(71) Applicant: Openfield SA, Versailles (FR)

(72) Inventors: Eric Donzier, Berchères sur Vesgre (FR); Linda Abbassi, Montigny le Bretonneux (FR); Emmanuel Tavernier, Paris (FR)

(73) Assignee: Openfield SA, Versailles (FR)

( * ) Notice: Subject to any disclaimer, the term of this patent is extended or adjusted under 35 U.S.C. 154(b) by 0 days.

(21) Appl. No.: 15/639,154

(22) Filed: Jun. 30, 2017

(65) Prior Publication Data
US 2018/0003032 A1    Jan. 4, 2018

(30) Foreign Application Priority Data

Jun. 30, 2016 (EP) .................................... 16177265

(51) Int. Cl.
*E21B 47/04*  (2012.01)
*G01V 3/26*  (2006.01)
(Continued)

(52) U.S. Cl.
CPC .......... *E21B 47/0228* (2020.05); *E21B 23/14* (2013.01); *E21B 47/04* (2013.01);
(Continued)

(58) Field of Classification Search
CPC ................... E21B 41/02216; E21B 41/0905
See application file for complete search history.

(56) References Cited

U.S. PATENT DOCUMENTS

| 2,558,427 A | 6/1951 | Fagen |
| 6,025,721 A * | 2/2000 | Vail, III .................. G01V 3/24 324/368 |

(Continued)

FOREIGN PATENT DOCUMENTS

| WO | WO2012082302 A1 | 6/2012 |
| WO | WO2015/102616 A1 | 7/2015 |

OTHER PUBLICATIONS

EP16177265, European Search Report, dated Dec. 1, 2016, The Hague.

(Continued)

*Primary Examiner* — Noam Reisner
(74) *Attorney, Agent, or Firm* — The Jansson Firm; Pehr B. Jasson

(57) ABSTRACT

A depth positioning method to position a production logging tool (1) and a measurement log in a hydrocarbon well (3) in production obtained by means of the tool, the depth positioning method comprises:
generating (S1, S2, S3, S1', S2', S3', S11, S12, S13) a set of magnetic measurements (MAG1, MAG) of a depth portion of the hydrocarbon well from a first passive magnetic sensor along the depth portion of the hydrocarbon well, the set of magnetic measurements comprising magnitude and/or direction measurements of the magnetic field that forms a characteristic magnetic field pattern representative of a surrounding magnetic environment of the hydrocarbon well all along the depth portion;
comparing (S4, S4', S14) the set of magnetic measurements (MAG1, MAG) to another set of magnetic measurements (MAG_R, MAG2), the other set of magnetic measurements being a reference set of magnetic measurements generated either by a same or similar passive magnetic sensor deployed and run in the (Continued)

hydrocarbon well earlier, or by a second passive magnetic sensor spaced from the first passive magnetic sensor from a defined distance (DS) deployed and run in the hydrocarbon well simultaneously; and determining (S4, S4', S14) the maximum of correlation between the set of magnetic measurements (MAG1, MAG) and the reference set of magnetic measurements (MAG_R, MAG2), the maximum being related to identifiable characteristic magnetic field pattern over a part of the depth portion.

13 Claims, 9 Drawing Sheets

(51) Int. Cl.
| | |
|---|---|
| *G01B 7/00* | (2006.01) |
| *E21B 47/26* | (2012.01) |
| *E21B 47/092* | (2012.01) |
| *G06F 17/15* | (2006.01) |
| *E21B 47/0228* | (2012.01) |
| *E21B 23/14* | (2006.01) |

(52) U.S. Cl.
CPC .......... *E21B 47/092* (2020.05); *E21B 47/26* (2020.05); *G01B 7/003* (2013.01); *G01V 3/26* (2013.01); *G06F 17/15* (2013.01)

(56) References Cited

U.S. PATENT DOCUMENTS

| | | | |
|---|---|---|---|
| 6,151,961 A | 11/2000 | Huber et al. | |
| 6,815,946 B2* | 11/2004 | Yoo | ................. E21B 47/0905 |
| | | | 166/255.1 |
| 2002/0145423 A1 | 10/2002 | Yoo | |
| 2009/0187345 A1* | 7/2009 | Blanz | ...................... G01V 1/40 |
| | | | 702/6 |
| 2012/0305313 A1* | 12/2012 | DiFoggio | ................. E21B 47/06 |
| | | | 175/45 |
| 2013/0255939 A1* | 10/2013 | Kumaran | ................. E21B 23/00 |
| | | | 166/255.1 |
| 2016/0145998 A1* | 5/2016 | Myeong | .................. E21B 47/09 |
| | | | 33/302 |
| 2017/0051604 A1* | 2/2017 | Donderici | ............... E21B 47/04 |
| 2017/0275985 A1* | 9/2017 | Fouda | ..................... E21B 34/06 |

OTHER PUBLICATIONS

"What You Need to Know about production Logging" by Jeffrey Aldrich, a production logging expert, published on Jun. 1, 2018 by Petroskills.

Datasheet PS Platform of Schlumberger, https://www.slb.com/-/media/files/fe/product-sheet/ps-platform-ps, Downloaded from the internet Dec. 8, 2020.

"Production Logging and its Implementation : A technical Review", Chodhury et al, IJPPE vol. 5 Issue 2, 2019 pp. 42-57 § 1.2.

Exhibit: Production logging websites showing exclusive reliance on CCL for depth correlation.

Eric Donzier, FAST (Flow Array Sensing Tool) Brochure, Openfield Technology Micro Instruments for Harsh Environments, 2011-2019, Katy, Texas.

Linda Abbassi, et al. Efficiency Improvements in Production Profiling Using Ultracompact Flow Array Sensing Technology, Petrophysics, vol. 59, No. 4 (Aug. 2018); pp. 457-488.

"Production Logging Principles", Mukerji, Parijat., Oilfield Review, Autumn 2013, 25 No. 3. pp. 63 and 64.

\* cited by examiner

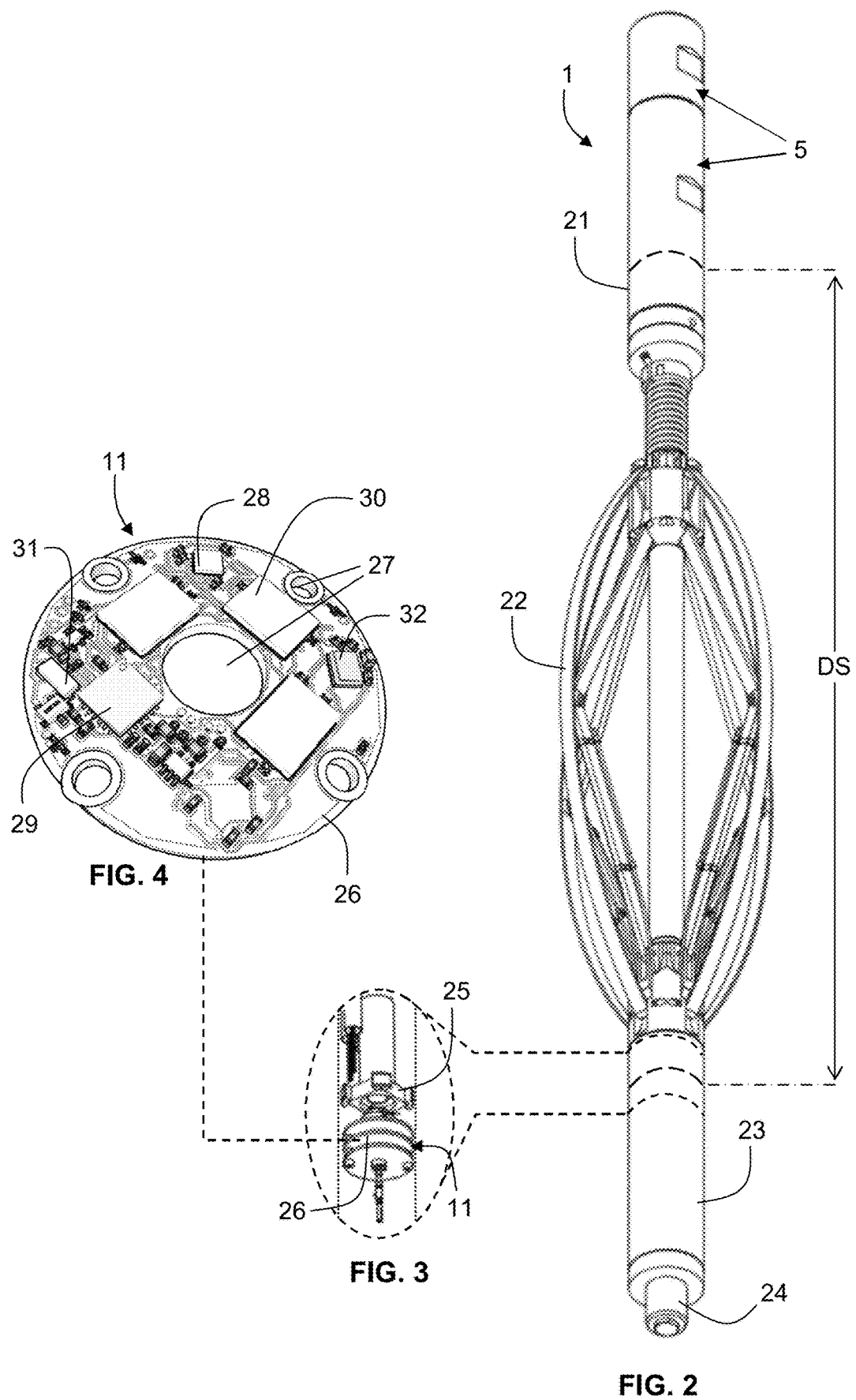

METHOD AND DEVICE FOR DEPTH POSITIONING DOWNHOLE TOOL AND ASSOCIATED MEASUREMENT LOG OF A HYDROCARBON WELL

TECHNICAL FIELD

The invention relates to a method to position a production logging tool and associated downhole measurements along the length of the well, referred to a log, in a borehole of a hydrocarbon well using passive magnetic measurements. The invention also relates to a depth positioning device and a production logging tool integrating such a device. Such device and tool typically operate in the harsh downhole environment of hydrocarbon wells at downhole pressure (typically in the range of one hundred to 1500 bars) and temperature (typically in the range of 50 to 200° C.) conditions, and in corrosive fluid.

BACKGROUND

During the drilling, the evaluation, the completion and subsequently the production of a hydrocarbon well, various parameters related to the drilled earth formations and the different phases (e.g. oil, gas and water) of multiphase fluid mixtures flowing into the borehole of the hydrocarbon well from the hydrocarbon bearing zones are measured and monitored. Various measurement logs are performed in order to evaluate and optimize the production of the hydrocarbon well. As examples, these measurements may be related to the flow contributions of the different perforated zones, the identification of fluid types and properties, such as water, oil and gas relative proportions (holdups), the presence of H2S, $CO_2$, sand particles, scale, asphalthenes, etc. The measurement logs may be used to decide on corrective actions such as the shut-in of zones responsible for unwanted water or sand production.

Production logging tools are commonly deployed in the borehole of the hydrocarbon well for performing measurements and/or interventions. The production logging tools are run down inside the well-bore from the top of the hydrocarbon well, the wellhead, down to the bottom of the hydrocarbon well. The production logging tools typically comprise various sensors acquiring data such as pressure, temperature, fluid density, fluid velocity, fluid conductivity along portions of the well-bore. The production logging tools are suspended by a line or cable which may also be used to communicate real time data to surface equipments. Current hydrocarbon wells often comprise a vertical well section, deviated well sections and horizontal well sections. In highly deviated or horizontal wells, the tool weight will not provide sufficient force to travel down, thus coiled tubing, rods or tractors are used to push the tools along the well-bore. Production logging measurements are often carried out in well casing sections comprising perforations.

It is critical to know precisely the depth at which measurements are made by the production logging tool sensors. On the one side, a hydrocarbon well may be several kilometers long, and, on the other side, the hydrocarbon bearing zones of interest may have thicknesses as small as one meter. Commonly, the distance along the well-bore from the production logging tool to surface is referred to as the depth, although it is not actually the true vertical depth because of the well-bore deviation from the vertical.

Various techniques are known for measuring depth.

A first technique is based on the surface measurement of wireline or slickline deployed length during unrolling. Even though elongation from weight and temperature expansion effects may be corrected to a certain level using modeling, errors up to several tens of meters per kilometer are commonly observed in the field.

Another technique is based on gamma ray measurements. A gamma ray sensor measures natural radioactivity of rocks providing a gamma ray signature of the geological layers traversed by the tool. The gamma ray signature is compared to reference logs from previous operations. A drawback is that the spatial resolution and accuracy depends on specific characteristics of the reservoir. Another drawback is that reference gamma ray logs are necessary. Further, production of water having a high scale content can dramatically affect the gamma ray logs. Furthermore, the gamma ray sensor comprises a sodium iodine crystal coupled to a photomultiplier and electronic units for generating high voltage and counting pulses. Thus, a further drawback is that the gamma ray sensor is bulky and expensive and therefore cannot be used for flowable recorder subs.

Still another technique is known as casing collar locator tool (CCL) that comprises strong permanent magnets generating a magnetic flux out of the tool and coils detecting the magnetic flux variation. The magnetic flux variation occurs when the CCL tool passes in front of well casing junctions or collars which have thicker wall on their threaded sections. A drawback is that the CCL signal is poorly repeatable and depends on tool velocity, the coil induced current or voltage being directly related to the magnetic flux variation associated to the permanent magnets movement relative to the collar. As a consequence, the CCL signal at low tool speed is very noisy and often difficult to interpret or even cannot be interpreted. In addition, the spatial resolution is limited by the length of the well casing sections (e.g. typically 5 meters). Thus, a casing collar locator tool is used to adjust log depths from different passes while being limited both at short range (e.g. typically sub-meter range), and long range (e.g. typically above 10 meters). A further drawback is that a casing collar locator tool will not work with production liners having flush joints or continuous liners such as coiled tubing. Furthermore, casing collar locator tools are also difficult to miniaturize due to the need for large sized permanent magnets to create sufficient magnetic flux and are expensive. Casing Collar Locator tool CCL is not compatible with integration into flowable recorder subs.

The document U.S. Pat. No. 7,260,479 describes a method for locating casing string joints using a measurement while drilling tool. The method includes deploying an MWD tool in a wellbore and measuring the magnetic field along a length of the wellbore. Changes in the magnetic field along the length of the wellbore are evaluated to determine the location of at least one casing joint. According to this document, the method may be utilized, for example, in sidetracking operations to avoid milling through a casing joint and may obviate the need for a separate wireline run to locate the casing joints. However, this method focuses on locating specific features on the casing geometry and misses the large scale positioning capability, at the level of the reservoir dimension.

The document WO 2011051429 describes a positioning tool for determining the position in a casing downhole. The positioning tool has a longitudinal tool axis and comprises a detecting unit comprising a first magnet for generating a magnetic field, a first sensor arranged in a first plane and at a first distance from the first magnet, for detecting changes in the magnetic field, and a second sensor arranged in the first plane and at a second distance from the first sensor along the axis, also for detecting changes in the magnetic field.

The document WO 2012082302 describes method and apparatus for actuating a production logging tool in wellbore includes acquiring a CCL data set or log from the wellbore that correlates recorded magnetic signals with measured depth, and selects a location within the wellbore for actuation of a wellbore device. The CCL log is then downloaded into an autonomous tool. The tool is programmed to sense collars as a function of time, thereby providing a second CCL log. The autonomous tool also matches sensed collars with physical signature from the first CCL log and then self-actuates the wellbore device at the selected location based upon a correlation of the first and second CCL logs.

WO2013007739 describes a positioning method for determining a position of a production logging tool moving at a velocity in a casing in a well, comprising the steps of measuring a magnitude and/or direction of a magnetic field by means of a first sensor several times over a time period while moving along a first part of the casing manufactured from metal, determining a manufacturing pattern of the casing along the first part from the measurement, measuring a magnitude and/or direction of a magnetic field by means of the first sensor several times over a time period while moving along a second part of the casing manufactured from metal, determining the velocity of the tool along the second part, adjusting the determined velocity of the tool along the second part based upon the manufacturing pattern.

WO2013092836 describes a downhole mapping system for identifying completion components having an inner surface in a casing in a completion. The downhole mapping system comprises a magnetic sensor tool having a longitudinal tool axis and comprising a detecting unit. The detecting unit comprises a first magnet for generating a magnetic field, and a first sensor arranged in a first plane and at a first distance from the first magnet, for detecting changes in the magnetic field. The sensor detects changes in the magnitude and/or direction of the magnetic field producing measured data of a profile of the casing. The downhole mapping system further comprises a reference database comprising magnetic reference data of completion components, and a processor comparing a set of the measured data with reference data from the database for identifying a substantially matching set of data representing a completion component stored in the reference database. The system further comprises a component scanning unit for scanning the inner surface for identifying a component and storing the data representing the component in the database.

WO2015009373 describes an apparatus and a method for locating a joint of a casing disposed in a borehole. The apparatus includes a sensor oriented in a plane orthogonal to a longitudinal axis of the casing. The sensor measures a magnetic field induced in the casing by the earth's magnetic field. A tool conveys the sensor through the casing along a path that is radially offset from a longitudinal axis of the casing. Transverse magnetic field measurements are obtained by the sensor at a plurality of depths along the casing. A change in the transverse measurements is identified and used to determine the location of the casing joint.

The critical importance of having an accurate and reliable depth requires for most operations to use several of the techniques described above and depth logs require careful analysis during log interpretation.

SUMMARY OF THE DISCLOSURE

It is an object to propose a depth positioning method to position a production logging tool and a measurement log obtained by means of said tool in a borehole of a hydrocarbon well in production using magnetic measurements that overcome one or more of the limitations of the existing methods and/or devices.

The depth positioning method is based on the deployment of one or more high sensitivity magnetic field sensors integrated into a production logging tool allowing detecting particular/specific patterns of the natural magnetic field present inside the wellbore that can be linked to a particular/specific position along the wellbore. The magnetic field presents inside the wellbore is related to the distortion of earth magnetic field by e.g. well casing geometry and metal material properties as well as influence from rocks properties. In practice, it leads to a complex and unique magnetic field distribution along the wellbore. Measuring such anomalies of the earth magnetic field along the wellbore provides signatures with high spatial resolution, typically exhibiting sub meter features as well as long range patterns with recognizable signatures over several tens or even hundreds of meters. The comparisons of magnetic logs between different tool passes and tool runs allow matching or aligning the depth positions of all the measurement logs in the wellbore. In particular, the method may be applied to accurately position the production logging tool respectively to a previous operation where the magnetic log is used as a reference. Embodiments of the method used for depth control are based on the correlation between magnetic field logs with reference logs obtained from previous run or passes. Compared to state of the art methods based on CCL, the natural magnetic field logs allow depth correlation with unprecedented repeatability.

Advantageously, this method can applied to small devices such as flowable recorders.

An embodiment of the method enables locating precisely the production logging tool with respect to a reference magnetic field log. This embodiment does not directly provide absolute accuracy on depth. Indeed any error on depth from the reference log is reported on the following tool runs. However, for many operations absolute accuracy is not required while repeatability is important, for example for aligning measurements with top and bottom position of each perforated zones of interest.

Another embodiment of the method makes use of magnetic signatures correlation between a pair or more of magnetic field sensors separated by a known distance. This embodiment allows deriving an accurate tool depth from time of flight computation and time integration.

According to one aspect, there is provided a depth positioning method to position a production logging tool and a measurement log in a hydrocarbon well in production obtained by means of said tool, the depth positioning method comprises:

generating a set of magnetic measurements of a depth portion of the hydrocarbon well from a first passive magnetic sensor along the depth portion of the hydrocarbon well, the set of magnetic measurements comprising magnitude and/or direction measurements of the magnetic field that forms a characteristic magnetic field pattern representative of a surrounding magnetic environment of the hydrocarbon well all along the depth portion;

comparing said set of magnetic measurements to another set of magnetic measurements, the other set of magnetic measurements being a reference set of magnetic measurements generated either by a same or similar passive magnetic sensor deployed and run in the hydrocarbon well earlier, or by a second passive magnetic sensor spaced from the first passive magnetic sensor from a defined distance deployed and run in the hydrocarbon well simultaneously;

determining the maximum of correlation between the set of magnetic measurements and the reference set of magnetic measurements, said maximum being related to identifiable characteristic magnetic field pattern over a part of the depth portion.

When the reference set of magnetic measurements is generated by the same or similar passive magnetic sensor deployed and run in the hydrocarbon well earlier, the method may further comprises:

determining a depth shift between the two set of magnetic measurements by determining the maximum of correlation in a sliding depth window;

calculating a corrected depth log; and correcting a depth positioning scale of a measurements log taken by another sensor responsive to at least one property of a multiphase flow mixture flowing in the hydrocarbon well or at least one property of a formation surrounding the hydrocarbon well based on the corrected depth log and a position of said sensor relatively to the first passive magnetic sensor.

The step of determining a depth shift may comprise:

a first optimization loop sweeping depth shift values and determining the depth shift which corresponds to a maximum of correlation; and a second optimization loop sweeping depth window values ranging between a depth window of several tens of meters and a depth window of a few meters.

When the reference set of magnetic measurements is generated by the second passive magnetic sensor spaced from the first passive magnetic sensor from the defined distance deployed and run in the hydrocarbon well simultaneously, the method may further comprises:

determining a time of flight between the two sets of magnetic measurements by determining the maximum of correlation in a sliding time window;

calculating a velocity of the first passive magnetic sensor along the depth portion of the hydrocarbon well;

calculating a depth log based on said velocity and a reference initial position; and generating a reference magnetic log by correcting a depth positioning scale of the first set of magnetic measurements based on said depth log.

The step of determining a time of flight may comprise:

a first optimization loop sweeping time of flight values and determining the time of flight which corresponds to a maximum of correlation; and a second optimization loop sweeping time window values ranging between a time window of several tens of seconds and a time window of a few seconds.

The depth positioning method may further comprise:

generating a first set of positioning measurements associated with the set of magnetic measurements of the first passive magnetic sensor, and a second set of positioning measurements associated with the set of magnetic measurements of the second passive magnetic sensor, the two sets of positioning measurements being generated by a first positioning sensor and a second positioning sensor close to the first passive magnetic sensor and the second passive magnetic sensor that are deployed and run in the hydrocarbon well simultaneously, respectively;

computing the magnetic measurements in a cylindrical or spherical coordinates system; and generating a reference magnetic log for each of the radial distance p, the azimuth φ and the height z according to the cylindrical coordinates system, or the radius r, the elevation θ and the azimuth φ according to the spherical coordinates system.

The depth positioning method may be used to determine a velocity of a production logging tool deployed and run along the depth portion of the hydrocarbon well, the production logging tool comprising at least two passive magnetic sensors.

The depth positioning method may be used to determine a density of wellbore fluid flowing into the depth portion of the borehole of the hydrocarbon well by correcting the depth positioning scale of a pressure gradient measurements log obtained from a pressure sensor and calculating the density by dividing the pressure gradient by earth gravity, eventually corrected by the cosine of an hydrocarbon well inclination in case of deviated hydrocarbon well.

The depth positioning method may be used to evaluate hydrocarbon well integrity by comparing the reference set of magnetic measurements taken at an earlier time corresponding to an undamaged well casing, to a subsequent set of magnetic measurements showing magnetic anomalies corresponding to a damaged well casing and relating said anomalies to damaged well casing portions depths.

According to a further aspect, there is provided a depth positioning device to position a production logging tool and a measurement log in a hydrocarbon well in production obtained by means of said tool, the depth positioning device comprises:

a first passive magnetic sensor arranged to generate a set of magnetic measurements of a depth portion of the hydrocarbon well, the set of magnetic measurements comprising multiple magnitude and/or direction measurements of the magnetic field that forms a characteristic magnetic field pattern representative of a surrounding magnetic environment of the borehole all along the depth portion;

means for deploying and running the first passive magnetic sensor through the borehole along the depth portion of the hydrocarbon well;

a processing unit:
arranged to compare said set of magnetic measurements to another set of magnetic measurements, the other set of magnetic measurements being a reference set of magnetic measurements generated either by a same or similar passive magnetic sensor deployed and run in the hydrocarbon well earlier, or by a second passive magnetic sensor spaced from the first passive magnetic sensor from a defined distance so as to be deployed and run in the hydrocarbon well simultaneously, and arranged to determine the maximum of correlation between the set of magnetic measurements and the reference set of magnetic measurements, said maximum being related to identifiable characteristic magnetic field pattern over a part of the depth portion.

The depth positioning device may further comprise a first positioning sensor close to the first passive magnetic sensor and a second positioning sensor close to the second passive magnetic sensor.

The depth positioning device may further comprise at least one electronic board including a quartz oscillator, a memory chip, the passive magnetic sensor realized as a three axis magnetometer chip, a positioning sensor realized as a three axis accelerometer chip, all being connected to the processing unit realized as a microcontroller.

The depth positioning device may further comprise two electronic boards positioned at the defined distance from each other.

According to still a further aspect, there is provided a production logging tool comprising a depth positioning device and at least one sensor responsive to at least one property of a multiphase flow mixture flowing in the hydrocarbon well or at least one property of a formation surrounding the borehole in the hydrocarbon well.

According to still a further aspect, there is provided a recording ball comprising a protective shell of spherical form having an average density such that it can be swept along the hydrocarbon well with a multiphase flow mixture flowing in the hydrocarbon well, a battery, an electronic board connected to at least one sensor responsive to at least one property of the multiphase flow mixture or at least one property of a formation surrounding the hydrocarbon well and to a depth positioning device.

With the method and device according to the present embodiments, it may be possible:

to improve the determination of the position of production logging tools and their associated measurements in a well, typically achieving sub-meter resolution as well as long range accuracy with recognizable signatures over several tens or even hundreds of meters;

to improve the depth measurements repeatability over time;

to improve depth accuracy during well operations;

to provide a methodology for merging measurement logs from different production logging tool runs or passes;

to provide a new methodology for interpreting depth logs;

to accurately position production logging tools into the hydrocarbon well;

to derive new measurements from accurate depths in order to give more insight on hydrocarbon well conditions (e.g. determining the density of fluid);

to allow deployment in open-hole sections of hydrocarbon well in production;

to allow integration into flowable recorder subs (recording ball); and to achieve low cost and easy maintenance because of the simple, robust and compact tool structure.

Other advantages will become apparent from the hereinafter description of the embodiments.

BRIEF DESCRIPTION OF THE DRAWINGS

The present invention is illustrated by way of examples and not limited to the accompanying drawings, in which like references indicate similar elements:

FIG. 2 is a perspective view of a production logging tool including a depth positioning device;

FIG. 3 is a perspective and transparent view showing the depth positioning device in the production logging tool of FIG. 2;

FIG. 4 is an enlarged perspective view of the electronic board of the depth positioning device of FIG. 3;

DETAILED DESCRIPTION

The invention will be understood from the following description, in which reference is made to the accompanying drawings.

Figure 1:
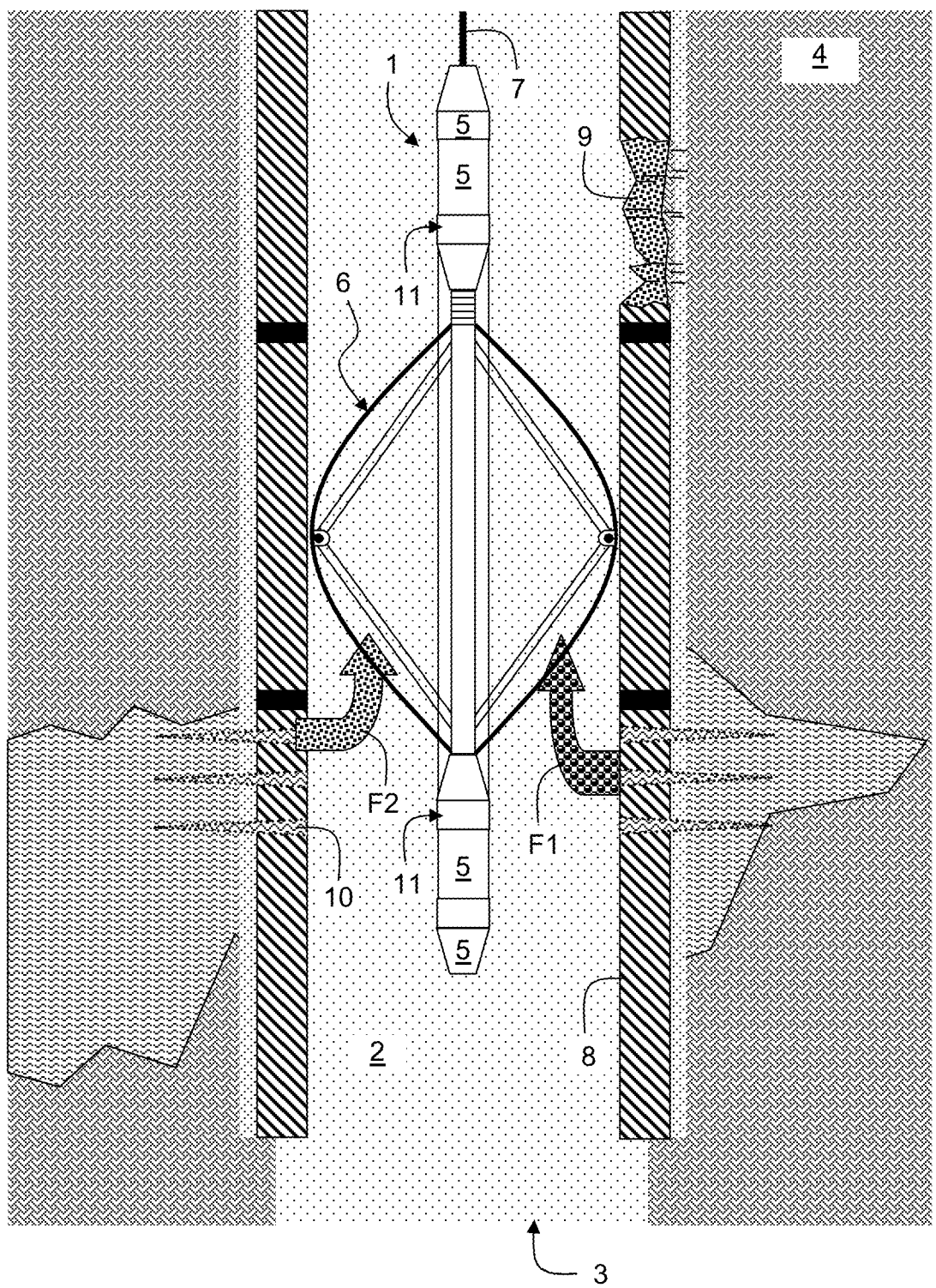
FIG. 1 is a cross-section view schematically illustrating a production logging tool including a depth positioning device deployed into a well bore of a hydrocarbon well in production.

FIG. 1 is a cross-section view schematically illustrating a production logging tool 1 including a depth positioning device 11 deployed into a well bore 2 of a hydrocarbon well 3 that has been drilled into an earth formation 4. The well bore refers to the drilled hole or borehole, including the open hole or uncased portion of the well. The borehole refers to the inside diameter of the wellbore wall, the rock face that bounds the drilled hole. The open hole refers to the uncased portion of a well. While most completions are cased, some are open, especially in horizontal or extended-reach wells where it may not be possible to cement casing efficiently. The depth positioning device 11 is suitable for performing any embodiment of the depth positioning method of the invention in a hydrocarbon well in a production phase. As an example, this depth positioning device 11 may be incorporated into the production logging tool 1. The production logging tool 1 may comprise various sub sections 5 having different functionalities, a centralizer 6 and coupled to surface equipments through a wireline 7. At least one sub section comprises a measuring device generating measurements logs, namely measurements versus depth or time, or both, of one or more physical quantities in or around a well. Wireline logs are taken downhole, transmitted through a wireline to surface and recorded there. Surface equipments are well known in the oilfield industry, thus not shown and described in details herein. There are numerous log measurements (e.g. electrical properties including resistivity and conductivity at various frequencies, sonic properties, active and passive nuclear measurements, dimensional measurements of the wellbore, formation fluid sampling, formation pressure measurement, etc.) possible with such a production logging tool 1 while it is displaced along and within the hydrocarbon well 3 drilled into the subterranean formation 4. The well bore 2 comprises a cased portion 8. The cased portion 8 may comprise corroded zone 9 (damaged well casing section) and perforated zone 10. Various fluid (that may include solid particles) entries F1, F2 may occur from the subterranean formation 4 towards the well bore 2.

FIG. 2 is a perspective view of the production logging tool 1 including a depth positioning device 11. The production logging tool 1 comprises a top section 21, a centralizer 22 and a bottom section 23. The bottom and top sections 21, 23 comprises appropriate connection means 24 (only one being visible in FIG. 2) to other sections of the tool, and/or other tools (string of tools) and/or tractor means and/or line for communication with surface equipment. The production logging tool 1 typically comprises various sensors 5 disposed inside the tool housing and/or along the tool housing and/or connected to the arms of the centralizer. Those sensors measure various parameters of the fluid F1, F2 inside the well bore 2 and/or flowing from the subterranean formation 4 around the well bore 2 as usual in the art (e.g. pressure, temperature, fluid density, fluid velocity, fluid conductivity, etc. . . . ).

Several sensors can be placed at the top, middle and bottom of the production logging tool in order to allow tool velocity measurement from time of flight measurement of magnetic field anomalies.

FIG. 3 is a perspective, exploded and transparent view showing an exemplary embodiment of the depth positioning device 11 in the production logging tool 1 of FIG. 2. The bottom section 23 comprises a mounting chassis 25 for supporting and mounting the electronic board 26 of the depth positioning device 11. The electronic board 26 has a circular shape. Other electronic boards associated with other sensors or devices of the production logging tool may be mounted in at a distance above and/or below the electronic board 26 of the depth positioning device 11.

FIG. 4 is an enlarged perspective view of an exemplary embodiment of the electronic board 26 of the depth positioning device 11 of FIG. 3. The electronic board 26 comprises several holes 27 for securing the board to the mounting chassis 25 and passing appropriate wire connectors (e.g. power and data/not shown). In a first embodiment, the electronic board 26 comprises a passive magnetic sensor 28, a processing unit 29, a memory 30 and a quartz oscillator 31. The passive magnetic sensor 28 may be a MEMS magnetometer integrated circuit, either a single-axis, or a dual-axis or a three-axis magnetometer. The processing unit 29 may be a microcontroller. In another embodiment, the electronic board 26 may further comprise an accelerometer and/or a gyroscope, for example a MEMS three axis accelerometer-gyroscope integrated circuit 32 (i.e. grouping both functions of 3-axis gyroscope and a 3-axis accelerometer).

A further depth positioning device 11 comprising a second passive magnetic sensor may be secured into the top section 21 of the production logging tool 1 in a similar fashion to the first passive magnetic sensor 28 into the bottom section 23. In this case, the two passive magnetic sensors are separated from each other by a fixed and defined distance DS, for example one meter in the production logging tool example of FIG. 2.

The housing of the production logging tool 1 is suitably made of non magnetic material such as stainless steel (e.g. stainless steel commercialized under the Inconel trademark) in order to minimize the effect of tool housing/mechanics on the passive magnetic sensor measurements. The centralizer 22 offers good tool centralization in order to have the sensor always positioned at the same place in the wellbore between successive passes and to measure stable earth magnetic field anomalies. However, as an alternative, acceptable measurement may also be obtained with a production logging tool that does not include a centralizer.

Figure 5:
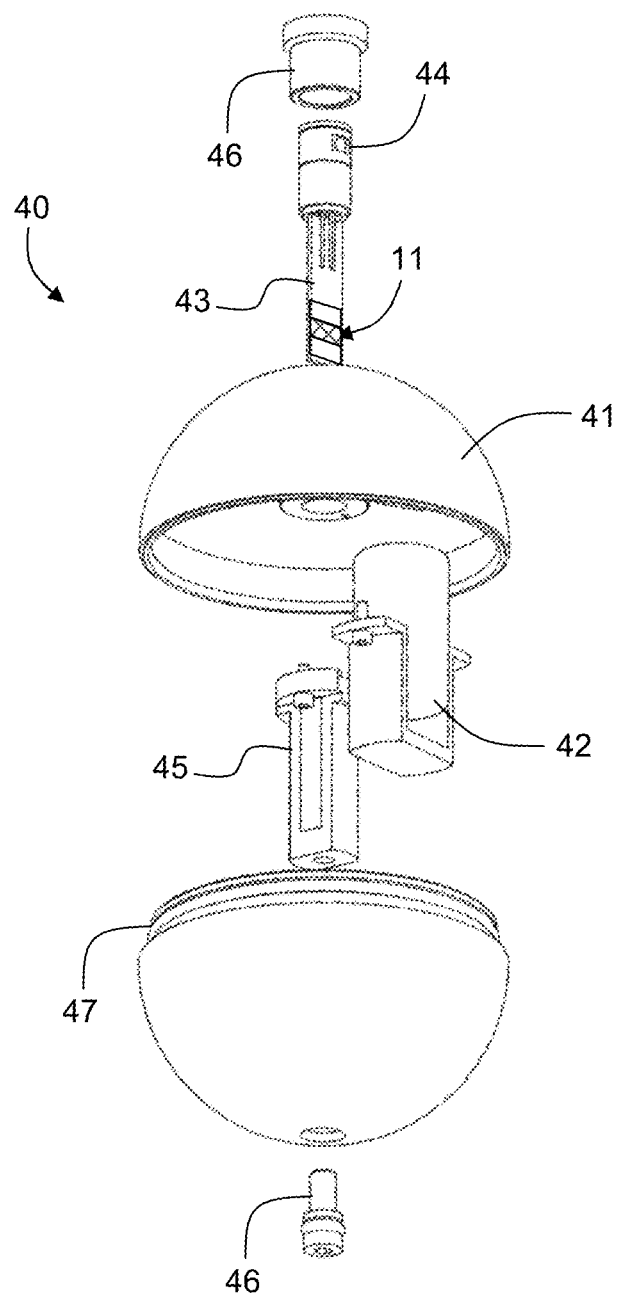
FIG. 5 is an exploded perspective view showing the depth positioning device in a flowable recorder subs or recording ball.

FIG. 5 is an exploded perspective view showing the depth positioning device in a flowable recorder subs or recording ball 40. The recording ball 40 is an autonomous measuring device that may be released downhole into the well bore to be transported to the surface through the fluids and collected at the surface (e.g. at the wellhead). The launch of the recording ball can be programmed in advance at fixed times or based on events detected downhole. On his way to the surface the recording ball will perform various measurements. The recording ball is prevented from remaining downhole by having an average density low enough so that it can be swept along the well with the flow for example less than 1.8 g/cc. Such recording balls can provide downhole data at critical times of operations of the hydrocarbon well and at places where it is impossible to place cables of electric or optical communications. For example, such recording balls enable controlling the operations of hydraulic multi-zone fracturing in horizontal and multilateral wells.

A recording ball 40 comprises a protective shell 41 that can be in the form of a hollow sphere made of a material such as titanium, in order to offer a sufficient resistance to pressure while minimizing the wall thickness. Such a sphere may have a diameter ranging from 2 cm to 5 cm. The recording ball 40 comprises internally to the shell 41 a battery and a battery support 42, an electronic board 43 and electronic board support 45 including the depth positioning device 11 according to the invention, an electronic processor and a memory. Various sensors 44 (e.g. a pressure, a temperature sensor, etc. . . . ) connected to the electronic board 43 may be coupled to the outside of the shell 41. The shell 41 may be formed by two half-spheres that are securely and water-tightly coupled together by appropriate securing means 46 and seals 47. The inertial sensors, gyroscopes and accelerometers, and magnetometers of the positioning device 11 are used to calculate the speed and trajectory of the recording ball during its ascent to the surface. This information may provide guidance on fluid inputs along the well, especially by measuring the acceleration of the module with the flow.

Figure 6:
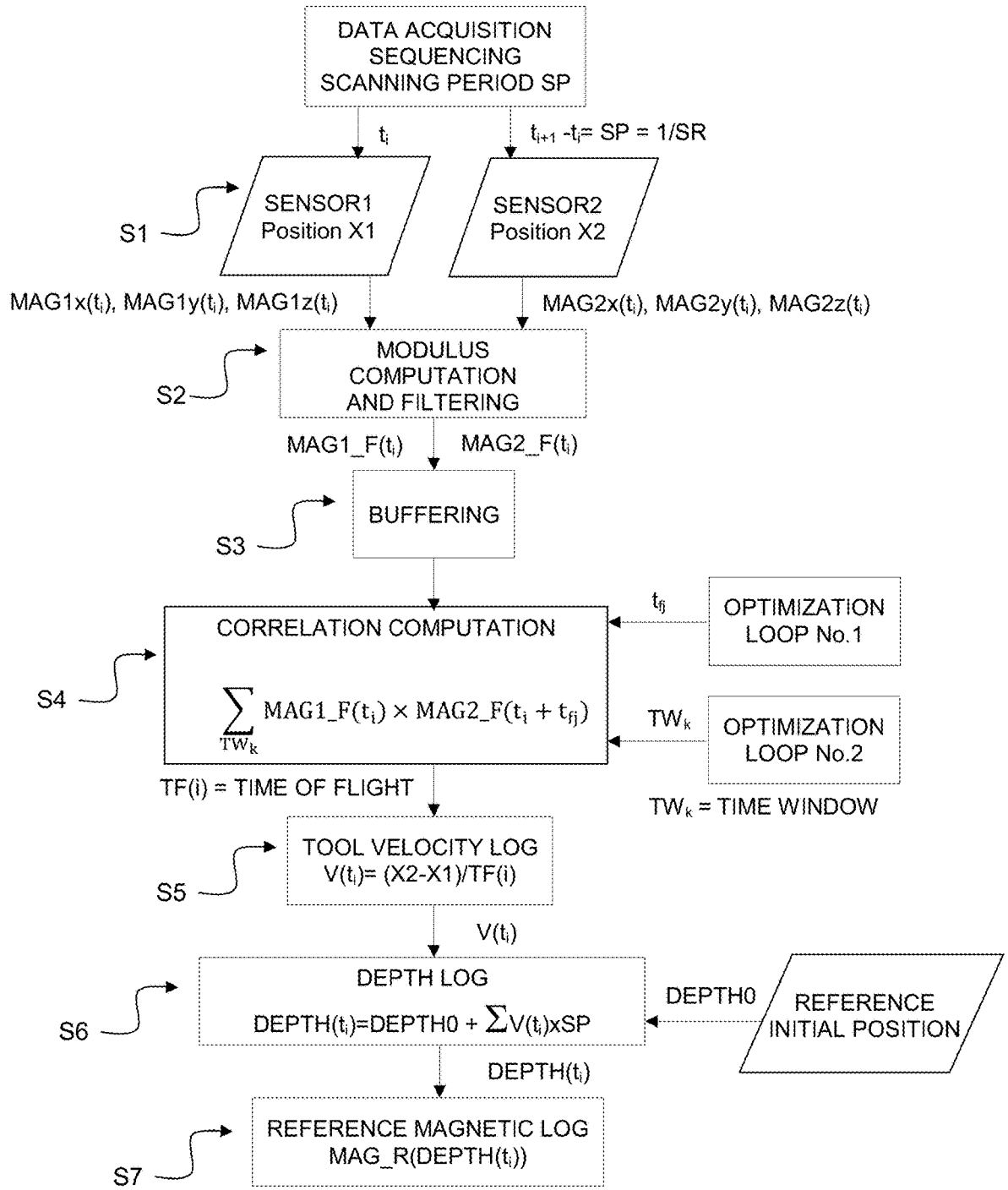
FIGS. 6 to 8 schematically illustrate various embodiments of the depth positioning method.
Figure 7:
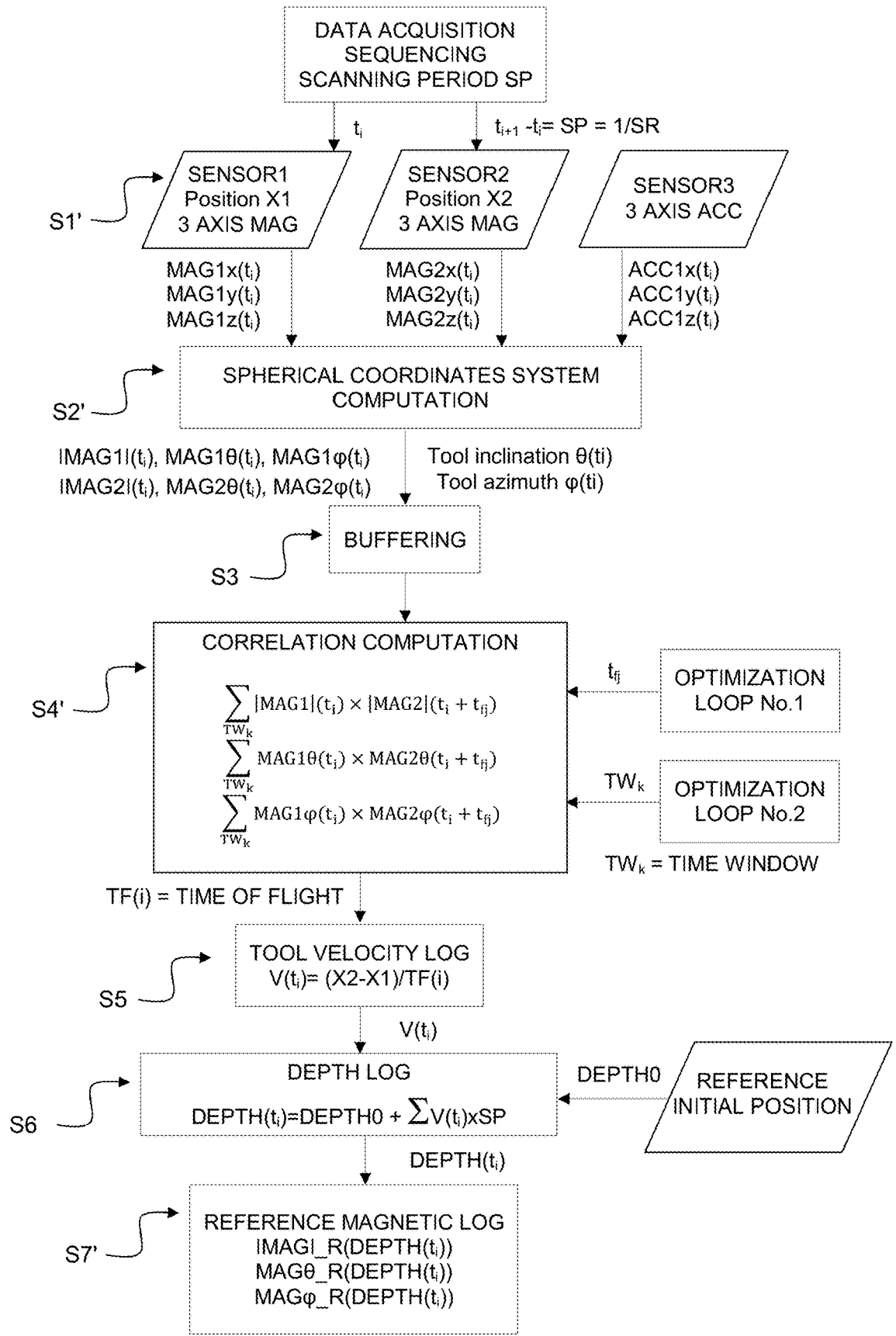
Figure 8:
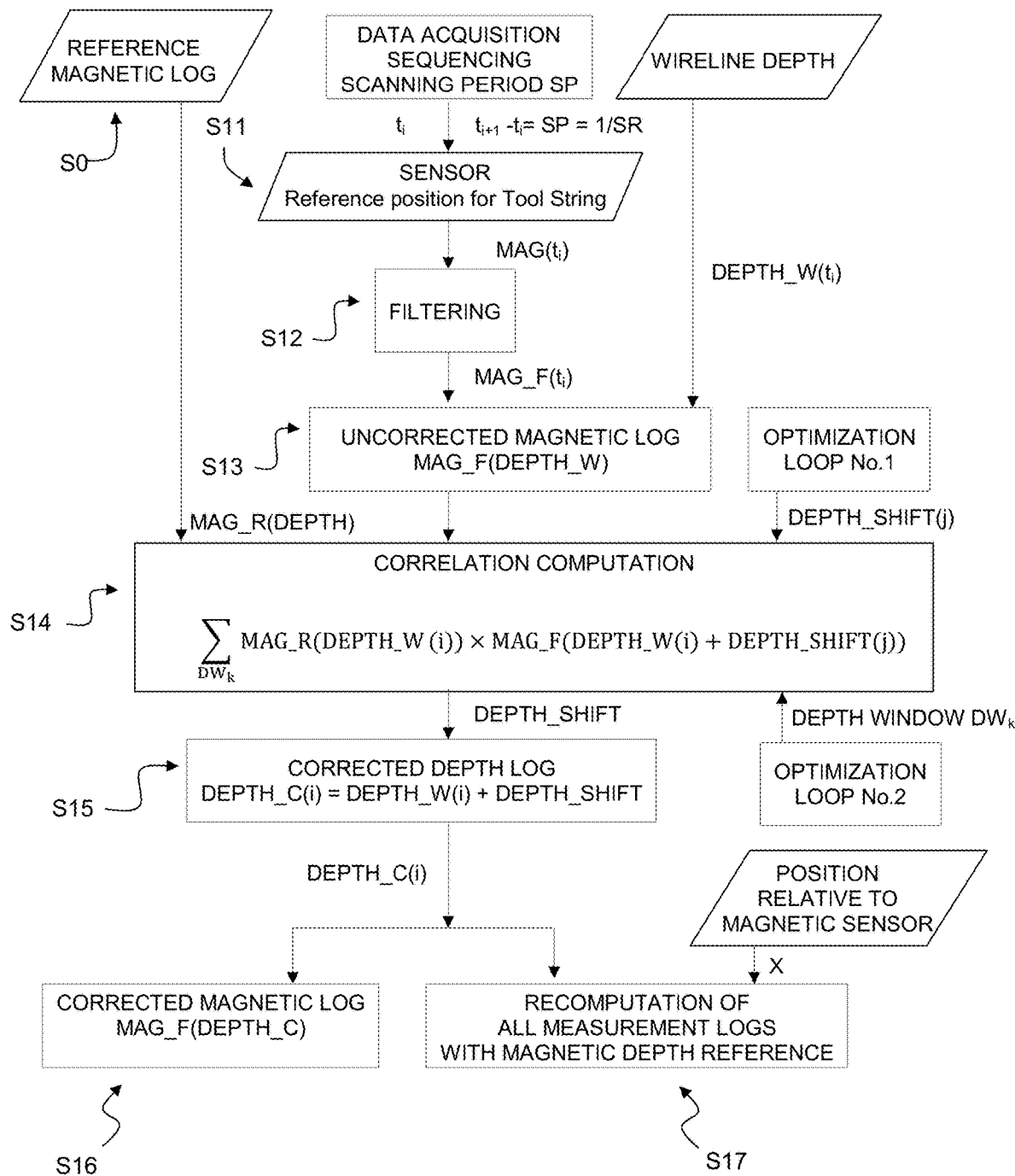

FIGS. 6 to 8 schematically illustrate various embodiments of the depth positioning method.

FIG. 6 schematically illustrates a first embodiment of the depth positioning method. This embodiment requires the use of two passive magnetic sensors, the first and second passive magnetic sensor being three-axis magnetometer generating signals in the three dimensions separated by a defined distance DS. The data acquisition sequencing scanning period (the inverse of the scanning rate SR) is related to the time interval between two measurements made at time $t_i$ and $t_{i+1}$, namely $t_{i+1} - t_i = SP = 1/SR$, for example SP is 0.1 second. This is accurately controlled by the processing unit 29 connected to the quartz oscillator 31. In a first step S1, the first magnetic sensor provides first signals $MAG1x(t_i)$, $MAG1y(t_i)$, $MAG1z(t_i)$ corresponding to the magnetic field in the three dimensions at a first position X1 and the second magnetic sensor provides second signals $MAG2x(t_i)$, $MAG2y(t_i)$, $MAG2z(t_i)$ corresponding to the magnetic field in the three dimensions at a second position X2. In a second step S2, the first signals and the second signals are filtered (for example to reduce the noise from the signals) and the modulus is calculated (square root of $MAG1x(t_i)^2 + MAG1y(t_i)^2 + MAG1z(t_i)^2$ and, respectively, square root of $MAG2x(t_i)^2 + MAG2y(t_i)^2 + MAG2z(t_i)^2$). In a third step S3, the first and second filtered signals $MAG1\_F(t_i)$ and $MAG2\_F(t_i)$ are buffered in the memory 30. The entire measuring job or a time portion of a measuring job may be stored in memory. Thus, after a defined time interval, the memory contains two sets of magnetic measurements associated with the first and second magnetic sensors. In a fourth step S4, features or patterns in the magnetic field measured by the first magnetic sensor at time $t_i$ are recognized by comparison with the magnetic field measured by the second sensor at a later time $t_i + t_{fi}$. Pattern recognition and time delay or time of flight TF(i) computation is performed by defining a sliding time window $TW_k$ on the magnetic measurements data and calculating a correlation value. A first optimization loop (No.1) generates incrementing time of flight values $t_{fi}$ and the processing unit computes the following summation formula and finds the time of flight value TF(i) that corresponds to a maximum of the sum indicating the best possible correlation (i.e. the time delay that maximizes the correlation value):

$$\sum_{TW_k} MAG1\_F(t_i) \times MAG2\_F(t_i + t_{fj})$$

The time of flight values of the first optimization loop are comprised in a time window covering the time of flight estimated from wireline cable speed plus and minus a certain percentage, typically 20%. The maximum value is obtained for optimal fit between signature curves in the chosen time window $TW_k$. The time window should be large enough to include identifiable patterns and short enough to correspond to a constant tool velocity. Although depending on well, logging and tool characteristics, the time window $TW_k$ is typically chosen in a range of a few seconds to several tens of seconds. An efficient way to determine the optimal time window TW uses a second optimization loops (No.2). The time window $TW_k$ is decremented in steps starting with a time window $TW_0$ of several tens of seconds and then narrowed down to a time window $TW_f$ of a few seconds. Alternatively, incrementing from a time window $TW_f$ of a few seconds to a time window $TW_0$ of several tens of seconds is also possible. The optimal time window TW is given for the maximum correlation value hereinbefore calculated.

As a result, in a fifth step S5, the time of flight value TF(i) allows computing the tool velocity $V(t_i)$ of the production logging tool along the well bore, namely:

$$V(t_i)=(X2-X1)/TF(i)=DS/TF(i)$$

Then, by an integration calculation, it is possible to calculate the distance run by the production logging tool. In a sixth step S6, a depth log (DEPTH LOG) is calculated based on said tool velocity $V(t_i)$ and a reference initial position $DEPTH_0$, namely:

$$DEPTH(t_i) = DEPTH0 + \sum_i V(t_i) \times SP$$

The reference position DEPTH0 may be either zero, i.e. the depth at surface or wellhead, or an arbitrary position close to a zone of interest (for example the position of a completion element such as a liner diameter change). In a seventh step S7, a reference magnetic log MAG_R(DEPTH($t_i$)) is generated which will be used to accurately position tools and correct measurement logs from other passes and other runs.

Thus, the magnetic field log correlation can be used to obtain an improved depth accuracy (and not just repeatability). In order to achieve this instead of measuring the magnetic field at a single location in the tool at least two measurements separated by a known distance are performed. With a pair or more sensors distributed along the length of the production logging tool, the recognition of magnetic signatures with a time delay between two sensors allows computing a robust tool velocity using the time of flight determination technique. This velocity measurement is unaffected by wireline cable length errors and provides the basis for an accurate magnetic reference log. The only requirement is to define a reference starting point, preferably the depth reference point chosen just above the production zone where data is the most important. In addition, a location that has a particular outstanding magnetic field pattern signature is advantageous in order to facilitate identification during future operations. Depth below that reference depth is computed by time integrating tool velocity. All future magnetic field logs will be correlated with respect to this log.

Having an accurate depth allows deriving new measurements and giving further more insight on well conditions. As an example, from a simple pressure measurement we can extract the density of fluid present inside the wellbore provided that depth is known with high precision. Indeed the pressure gradient, i.e. the variation of pressure with depth is a direct measurement of density multiplied by the earth gravity for a vertical wellbore. In case of deviated wellbore, the result is corrected by the cosine of the inclination. With state of the art depth measurement performance poor results are obtained and operator often uses nuclear tools based on gamma ray attenuation to measure fluid density. With depth logs obtained with the method of the invention, the accuracy on fluid density competes with nuclear technology at no extra cost on operations and no risk for the environment. Further, knowing tool velocity allows calibrating flow sensors that measure fluid velocity relatively to the tool and not relatively to the wellbore.

FIG. 7 schematically illustrates another embodiment of the depth positioning method. This embodiment differs from the first embodiment in that the first and second passive magnetic sensor are three-axis magnetometer coupled to a three-axis accelerometer-gyroscope sensor generating magnetic and acceleration signals in the three dimensions, respectively. Thus, in the first step S1', the first magnetic sensor provides first signals $MAG1x(t_i)$, $MAG1y(t_i)$, $MAG1z(t_i)$ corresponding to the magnetic field in the three dimensions. Further, the second magnetic sensor provides second signals $MAG2x(t_i)$, $MAG2y(t_i)$, $MAG2z(t_i)$ corresponding to the magnetic field in the three dimensions. The accelerometer sensor provides first signals $ACC1x(t_i)$, $ACC1y(t_i)$, $ACC1z(t_i)$ corresponding to the acceleration in the three dimensions. A gyroscope can be added or integrated to the accelerometer in order to compute a robust and accurate acceleration vector even when the tool moves or vibrates. In the second step S2', the first signals and the second signals are filtered and the modulus $IMAG1I(t_i)$, $IMAG2I(t_i)$, the elevation $MAG1\theta(t_i)$, $MAG2\theta(t_i)$ and the azimuth $MAG1\varphi(t_i)$, $MAG2\varphi(t_i)$ values of the magnetic field according to a spherical coordinates system are calculated. Also, the tool inclination $\theta(t_i)$ and the tool azimuth $\varphi(t_i)$ can be determined from the accelerometer-gyroscope measurements. Subsequently, the steps are identical to the first embodiment except that three reference magnetic logs in modulus IMAG_RI(DEPTH($t_i$)), in elevation MAG$\theta$_R(DEPTH($t_i$)) and in azimuth MAG$\varphi$_R(DEPTH($t_i$)) can be generated by correcting a depth positioning scale of one of the sets of magnetic measurements based on the depth log DEPTH($t_i$) in spherical coordinates system (step S7'). Alternatively, in a similar fashion, the correlation analysis may also be performed on the three-axis of the magnetic field vector or any angles with respect to the axis of the well-bore. Correlation on the vector direction (e.g. elevation, azimuth) gives other details on magnetic signatures and further improved capabilities to detect anisotropic anomalies. This is advantageous when logging through completion equipments which have non axis-symmetric shapes such as side pocket mandrels or monitoring pipe or casing damages of deviated well bore sections where corrosion often occurs due to water stagnation at the bottom part of the pipe or casing.

FIG. 8 schematically illustrates still another embodiment of the depth positioning method. This embodiment requires the use of a single passive magnetic sensor, and the earlier generation of a first set of magnetic measurements (step S0) to produce a reference magnetic log MAG_R(DEPTH). As in the other embodiment, the data acquisition sequencing scanning rate SR is related to the time interval between two measurements made at time $t_i$ and $t_{i+1}$, namely $t_{i+1}-t_i=SP=1/SR$, for example SP is 0.1 second. In a first step S11, the magnetic sensor provides a signal $MAG(t_i)$ corresponding to the modulus of the magnetic field at a reference position for the tool string, ie the position of the magnetic sensor. In a second step S12, the signal $MAG(t_i)$ is filtered. In a third step S13, the filtered signals $MAG\_F(t_i)$ are buffered in the memory 30. After a defined time interval, the memory contains a second set of magnetic measurements associated to a depth $DEPTH\_W(t_i)$ estimated by, for example, the wireline depth measurement system (see details in the background section). It is to be noted that the wireline depth measurement system may provide measurements either in real time (simultaneously or quasi-simultaneously with the passive magnetic sensor), or at a later time when operating as a recorder (the respective acquisition of the wireline depth measurement system and of the passive magnetic sensor resulting from two separate acquisition systems). This second set of magnetic measurements constitutes an uncorrected magnetic log $MAG\_F(DEPTH\_W)$. In a fourth step S14, features or patterns in the magnetic field measured by the magnetic sensor at depth DEPTH_W are recognized by comparison with the magnetic field from the reference magnetic log $MAG\_R(DEPTH)$. Pattern recognition and depth shift $DEPTH\_SHIFT(j)$ computation is performed by defining a sliding depth window $DW_k$ on the magnetic measurements data and calculating a correlation value. A first optimization loop (No.1) generates incrementing depth shift values $DEPTH\_SHIFT(j)$ and the processing unit computes the following summation formula and finds the depth shift DEPTH_SHIFT which corresponds to a maximum of the sum indicating the best possible correlation (i.e. the depth shift value that maximizes the correlation value) within the corresponding depth window $DW_k$:

$$\sum_{DW_k} MAG\_R(DEPTH\_W(i)) \times MAG\_F(DEPTH\_W(i) + DEPTH\_SHIFT(j))$$

Such correlation calculation is done by the product of the shifted and unshifted curves over a window $DW_k$. The maximum value is obtained for optimal fit between signature curves in the chosen depth window $DW_k$. The depth window should include identifiable patterns which can be associated to a section of the well with a high level of confidence, i.e. with a very low probability that another section of the well has similar pattern or signature. In practice, the optimal depth window DW is the largest possible which includes unique well patterns, possibly several tens of meters long, but small enough so that depth correction stays constant within this depth window (which is related to the accuracy of the wireline depth). Both a high confidence on position and a high spatial resolution can be achieved on corrected logs by using this method. An efficient way to determine the optimal depth window DW uses a second optimization loops (No.2). The depth window $DW_k$ is decremented in steps starting with a depth window $DW_0$ of several tens of meters and then narrowed down to a depth window $DW_f$ of a few meters. Alternatively, incrementing from a depth window $DW_f$ of a few meters to a depth window $DW_0$ of several tens of meters is also possible. The optimal depth window DW is given for the maximum correlation value hereinbefore calculated.

As a result, in a fifth step S15, the depth shift value DEPTH_SHIFT(i) allows computing a corrected depth log DEPTH_C(i), namely:

DEPTH_C(i)=DEPTH_W(i)+DEPTH_SHIFT(i)

In a sixth step S16, a corrected magnetic log MAG_F (DEPTH_C) is calculated based on said corrected depth log DEPTH_C(i). In a seventh step S17, all measurements logs taken by other sensors of the production logging tool can be corrected regarding the depth positioning by recomputing with the corrected depth log DEPTH_C(i) based on the position of the concerned sensor relative to the passive magnetic sensor (distance X between the first passive magnetic sensor and the other sensor).

In the case of a production logging tool operating in a recorder mode, the "wireline depth" and the "magnetic depth" are acquired from two separate acquisition systems which generate two data files versus time. These data files are merged together after the production logging tool is retrieved at the surface and the tool memory is downloaded. The file merging step generates a file with magnetic measurements that are synchronized versus wireline depths (during the third step S13), all subsequent steps of FIG. 8 being the same.

FIGS. 9 to 13 are diagrams illustrating typical magnetic signatures measured with the depth positioning device of the invention and used to implement at least one embodiment of the depth positioning method of the invention.

Figure 9:
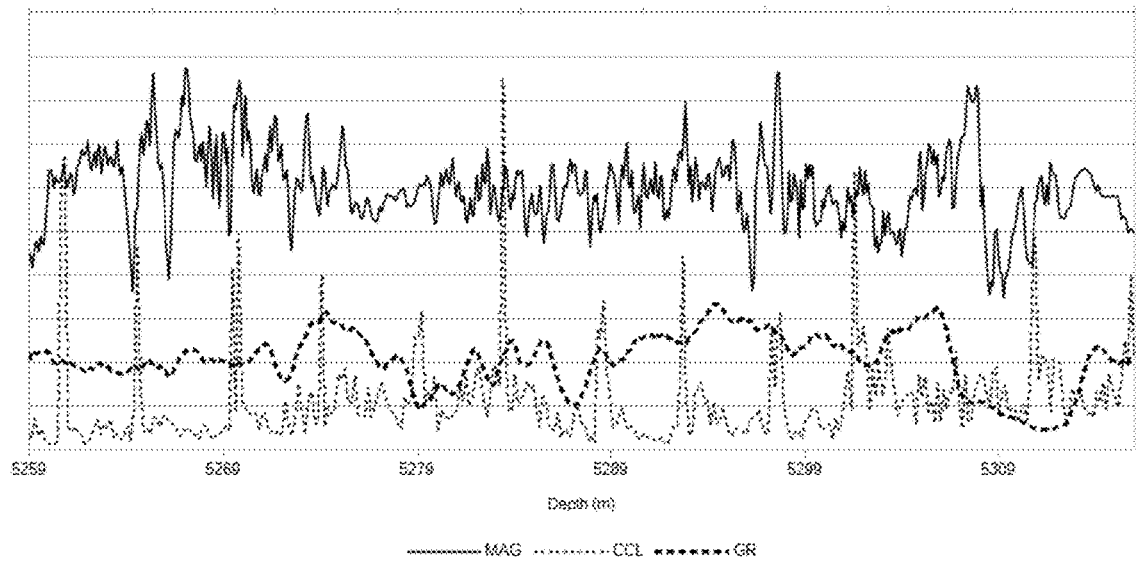
FIGS. 9 to 13 are diagrams illustrating typical magnetic signatures measured with the depth positioning device of the invention and used to implement at least one embodiment of the depth positioning method of the invention.

FIG. 9 shows an example of the magnetic measurement logs MAG (full line) in a gas well in comparison with CCL measurements (dotted line) and Gamma Ray GR measurements (dash line) for a depth interval from 5259 m to 5319 m. The CCL measurements have large peaks corresponding to the collars locations, only those large peaks are repeatable while unstable signals can be seen in-between. The Gamma Ray measurements are poorly interpretable in such a short depth interval of around 60 m. Unlike CCL and GR measurements, the magnetic measurement log according to the invention contains high resolution features/patterns that are repeatable and identifiable both at large scale of over hundreds meters down to sub-meter resolution. The magnetic log provides a unique signature of the well in its entirety and also within its portions, the magnetic log representing the fingerprint of the well. The large range of length scales of information-rich patterns (patterns with very low probability to be reproduced elsewhere in the same well or in another well) allows accurate and reliable determination of the position at which those patterns correspond. This remarkable characteristic is related to the fact that the magnetic field in the wellbore is influenced by several phenomena which also have a large range of length scales such as the earth magnetic field itself with its anomalies, presence of magnetized rock layers, proximity to completion pipes (casing, tubing, joints, mandrels, screens, etc.), geometries and material properties, etc. . . . .

Figure 10:
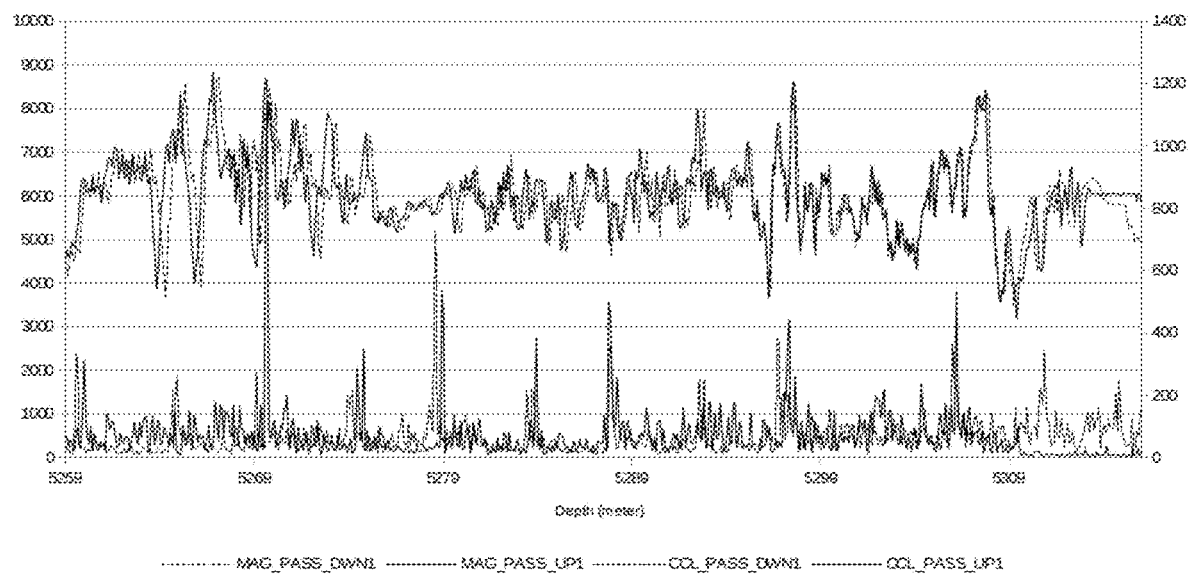

FIG. 10 shows two passes (up and down passes) in a gas well of a production logging tool including a CCL device and a magnetic sensor of a depth positioning device, namely magnetic measurements MAG (top signals MAG_PASS_DWN1 and MAG_PASS_UP1) in comparison with CCL measurements (bottom signals CCL_PASS_DWN1 and CCL_PASS_UP1). The up and down passes MAG_PASS_DWN1 and MAG_PASS_UP1 demonstrate that the magnetic signature is repeatable since both signals resulting from up and down passes fairly superpose each other.

Figure 11:
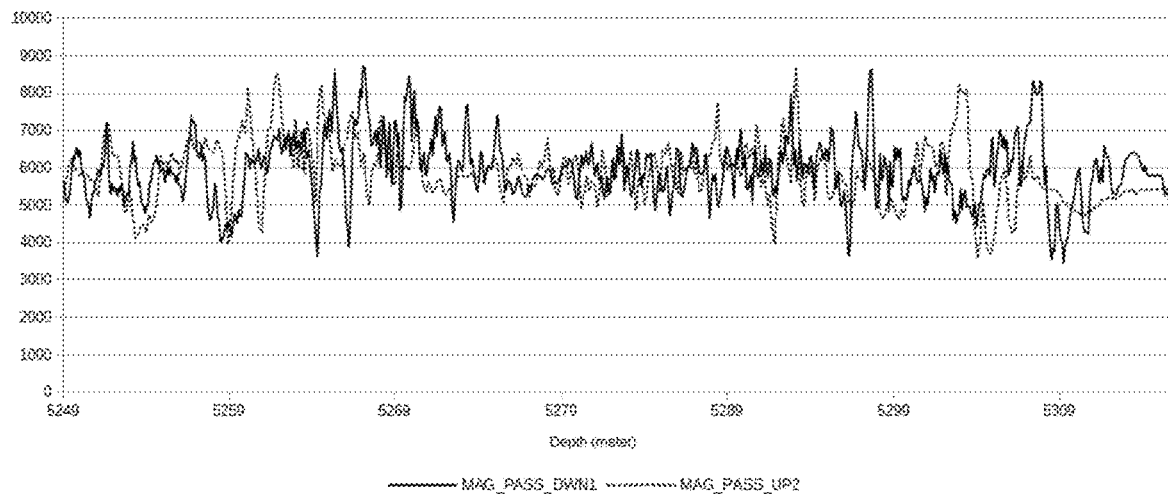
Figure 12:
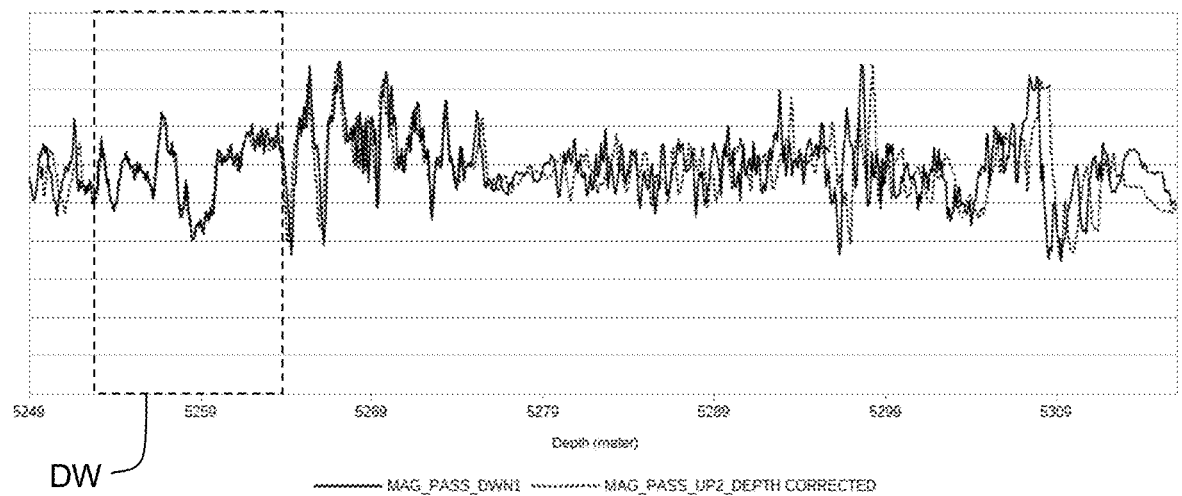

FIG. 11 shows two passes (up and down passes) of a production logging tool including a magnetic sensor of a depth positioning device, the measurements of the two passes being taken at different speed, in this example respectively 10 and 20 meters per minute (full line MAG_PASS_DWN1 and dotted line MAG_PASS_UP2). It is to be noted that in the initial acquisition the magnetic signatures from both passes do not fit. An analysis shows that this is due to a reference depth given by the wireline system that has an error of several meters. FIG. 12 illustrates that applying a correction of 4.5 m on the wireline reference values allows obtaining almost a perfect match in the depth interval from 5300 m to 5310 m (between both signals MAG_PASS_DWN1 in full line and MAG_PASS_UP2 DEPTH CORRECTED in dotted line). The correction is obtained with the embodiment hereinbefore described in relation with FIG. 8. More generally pattern recognition algorithms can be used to perform a continuous depth logs correction by defining a sliding depth window DW (an example of depth window DW is depicted by a dash-line rectangle in FIG. 12) on the magnetic signature and determining the depth shift that maximizes the correlation. The correlation method allows defining an accurate depth reference for the logs which cannot be achieved solely with Gamma Ray and CCL conventional methods. Thus, the interpretation of measurement logs performed by other sensors (pressure, temperature, density, conductivity, etc. . . . ) and remedial actions planning are significantly improved.

Figure 13:
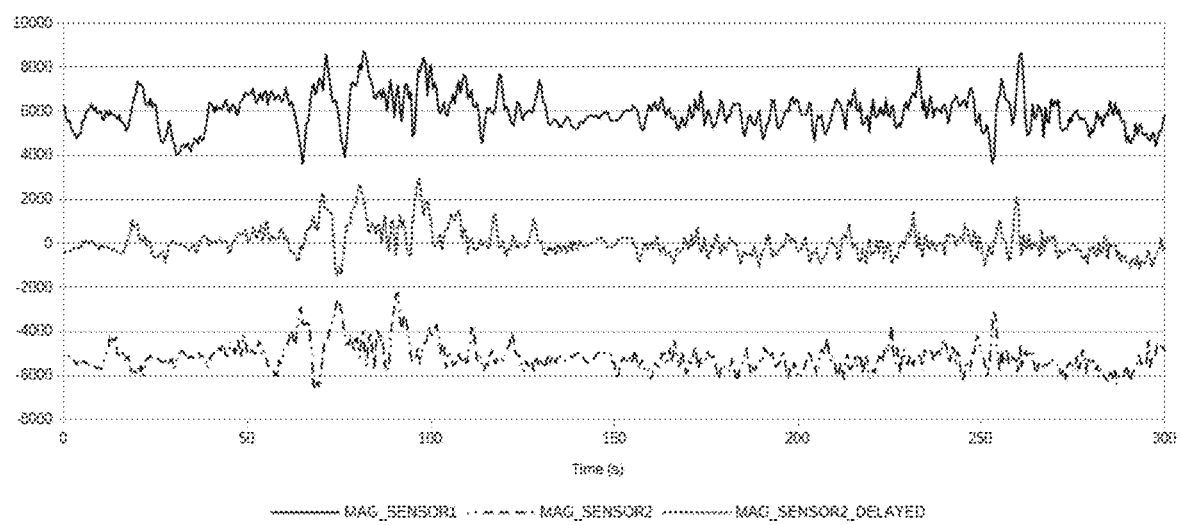

FIG. 13 represents the signals MAG_SENSOR1 and MAG_SENSOR2 of two passive magnetic sensors spaced by one meter. By shifting in time the signal of the second sensor MAG_SENSOR2_DELAYED after implementing the depth positioning method in accordance with the first embodiment of the depth positioning method (see FIG. 5) and determining the time of flight TF(i), it is found that the patterns MAG_SENSOR1 and MAG_SENSOR2_DELAYED line up.

It should be appreciated that embodiments of the production logging tool according to the present invention are not limited to the embodiment showing vertical hydrocarbon well bore, the invention being also applicable whatever the configuration of the well bore, namely horizontal, deviated or a combination of vertical, deviated and/or horizontal portions, cased or uncased. Also, the magnetic depth positioning device of the invention is not limited to an application to a production logging tool, but can be easily adapted to various applications to analysis tools operating at downhole pressure and temperature conditions, e.g. a wireline tool, a tool that is connected to a tractor, kickover tools which deploy gas lift valves or gauges in side pocket mandrels, plugs, cutter tools, etc. . . . . For complex well completion configurations having, valves, gas lift mandrels, pumps, chemical injectors, sand screens, etc. . . . where the deployment of lines, cables, rods or tubings is difficult or impossible, magnetic measurements may be performed by autonomous miniature recording subs that travel though the well and are flowed back to surface and retrieved for downloading the registered magnetic measurements, simultaneously with other measurements related to the fluid or the formation. All those tools would greatly benefit from the integration of the depth positioning device and method of the invention in order to help locating the precise position for the intervention.

The invention claimed is:

1. A production logging tool for analysis of a well bore of a hydrocarbon well in which fluid entries occur from the subterranean formations around the well bore and fluid flows in the well bore, comprising: a centralizer having arms to provide tool centralization in the wellbore; a housing containing: at least one sensor responsive to at least one property of a multiphase flow mixture flowing in the hydrocarbon well or at least one property of a formation surrounding the hydrocarbon well; and at least one depth positioning device comprising: a first passive magnetic sensor arranged to generate a first set of magnetic measurements of a depth portion of the hydrocarbon well, wherein the depth is the distance along the well-bore from the production logging tool to a reference location located on the well-bore, the first set of magnetic measurements comprising multiple magnitude and/or direction measurements of the magnetic field that forms a characteristic magnetic field pattern representative of a surrounding magnetic environment of the hydrocarbon well all along the depth portion; and a processor programmed to receive a reference depth; receive the first set of magnetic measurements data from the first passive magnetic sensor; receive a second set of magnetic measurements data; correlate the first set of magnetic measurements data with the second set of magnetic measurements data to determine a depth correction; produce a corrected depth log from the reference depth and the depth correction; and produce a data log indexed to said corrected depth log.

2. The production logging tool of claim 1, wherein the at least one sensor responsive to at least one property of a multiphase flow mixture flowing in the hydrocarbon well or at least one property of a formation surrounding the hydrocarbon well measures a property selected from the set including pressure, temperature, fluid density, fluid velocity, and fluid conductivity.

3. The production logging tool of claim 1, further comprising
 a second magnetic sensor located in the housing and arranged to generate the second set of magnetic measurements of a depth portion of the hydrocarbon well, the second set of magnetic measurements comprising multiple magnitude and/or direction measurements of the magnetic field that forms a characteristic magnetic field pattern representative of a surrounding magnetic environment of the hydrocarbon well all along the depth portion; and
 wherein the processor receives the second set of magnetic measurements data from the second magnetic sensor.

4. The production logging tool of claim 3, wherein the processor is programmed to correlate the first set of magnetic data with the second set of magnetic measurements data to determine a depth correction by:
 indexing the first set of magnetic measurements data and the second set of magnetic measurements data by time;
 defining a sliding time window on the time index of the first and second magnetic measurements.

5. The production logging tool of claim 4, wherein the processor is programmed to:
 correlate the first set of magnetic measurements data with the second set of magnetic measurements data by:
  defining a sliding time window on the first set of magnetic measurements data with the second set of magnetic measurements data; and
  determining a time of flight value by calculating a correlation value from the first set of magnetic measurements data with the second set of magnetic measurements data;
 determine tool velocity from relative positions of the first sensor and of the second sensor and the determined time of flight value; and
 determine the depth correction from the tool velocity and a scanning period between successive depth measurements.

6. The production logging tool of claim 1, wherein the first set of measurements data is obtained by running the production logging tool in a first direction in the wellbore and the second set of measurements data is obtained by running the production logging tool in a second direction that is opposite to the first direction in the wellbore.

7. The production logging tool of claim 6, wherein the processor is programmed to correlate the first set of magnetic data with the second set of magnetic measurements data to determine a depth correction by:
   indexing the first set of magnetic measurements data and the second set of magnetic measurements data by time;
   defining a sliding time window on the time index of the first and second magnetic measurements.

8. The production logging tool of claim 7, wherein the processor is programmed to:
   correlate the first set of magnetic measurements data with the second set of magnetic measurements data by:
      defining a sliding time window on the first set of magnetic measurements data with the second set of magnetic measurements data; and
      determining a time of flight value by calculating a correlation value from the first set of magnetic measurements data with the second set of magnetic measurements data;
   determine tool velocity from relative positions of the first sensor and of the second sensor and the determined time of flight value; and
   determine the depth correction from the tool velocity and a scanning period between successive depth measurements.

9. The production logging tool of claim 1, wherein the second set of measurements data is obtained from reference data stored in a memory of the production logging tool.

10. The production logging tool of claim 9, wherein the processor is programmed to correlate the first set of magnetic data with the second set of magnetic measurements data to determine a depth correction by:
    indexing the first set of magnetic measurements data and the second set of magnetic measurements data by time;
    defining a sliding time window on the time index of the first and second magnetic measurements.

11. The production logging tool of claim 10, wherein the processor is programmed to:
    correlate the first set of magnetic measurements data with the second set of magnetic measurements data by:
       defining a sliding time window on the first set of magnetic measurements data with the second set of magnetic measurements data; and
       determining a time of flight value by calculating a correlation value from the first set of magnetic measurements data with the second set of magnetic measurements data;
    determine tool velocity from relative positions of the first sensor and of the second sensor and the determined time of flight value; and
    determine the depth correction from the tool velocity and a scanning period between successive depth measurements.

12. The production logging tool of claim 1 wherein the reference location is the surface.

13. The production logging tool of claim 1 wherein the reference location is an arbitrary location near a zone of interest.

* * * * *